(12) United States Patent
Randrianarivony (10) Patent No.: US 10,337,654 B2
(45) Date of Patent: Jul. 2, 2019

(54) TOROIDAL FLUID SWIVEL FOR HIGH PRESSURE APPLICATIONS

(71) Applicant: SINGLE BUOY MOORINGS INC., Marly (CH)

(72) Inventor: Liva Christian Randrianarivony, Eze bord de Mer (FR)

(73) Assignee: SINGLE BUOY MOORINGS INC., Marly (CH)

( * ) Notice: Subject to any disclaimer, the term of this patent is extended or adjusted under 35 U.S.C. 154(b) by 678 days.

(21) Appl. No.: 14/902,692

(22) PCT Filed: Jul. 2, 2014

(86) PCT No.: PCT/EP2014/064089
§ 371 (c)(1),
(2) Date: Jan. 4, 2016

(87) PCT Pub. No.: WO2015/000973
PCT Pub. Date: Jan. 8, 2015

(65) Prior Publication Data
US 2016/0161036 A1     Jun. 9, 2016

(51) Int. Cl.
*F16L 27/087*     (2006.01)

(52) U.S. Cl.
CPC .................. *F16L 27/087* (2013.01)

(58) Field of Classification Search
CPC .................................................. F16L 27/087
(Continued)

(56) References Cited

U.S. PATENT DOCUMENTS

| 4,647,077 A | * | 3/1987 | Ethridge | ............... F16L 39/06 285/281 |
| 4,925,219 A | * | 5/1990 | Pollack | ............... F16L 27/087 285/281 |

(Continued)

FOREIGN PATENT DOCUMENTS

| EP | 0 213 661 A1 | 3/1987 |
| EP | 2 360 089 A1 | 8/2011 |

(Continued)

OTHER PUBLICATIONS

International Search Report, dated Sep. 19, 2014, from corresponding PCT application.

*Primary Examiner* — David Bochna
(74) *Attorney, Agent, or Firm* — Young & Thompson (57) ABSTRACT

A fluid swivel for fluid transfer across a rotary interface includes inner annular and outer annular elements, located with their adjacent surfaces in close proximity to define a chamber between the adjacent surfaces. The swivel inner annular element has a conduit connected to an end of an incoming fluid line. The outer annular element is connected to outgoing product piping and has a primary duct for transport of fluid from the chamber to the product piping. The swivel includes an outer reinforcing annular wall arranged adjacent to the outer peripheral wall of the outer annular element. The outer reinforcing annular wall has two peripheral centering surface portions for contacting and/or registering with the outer peripheral wall of the outer annular element. The outer reinforcing annular wall further has a central peripheral opening extending along a portion of the periphery for allowing the primary duct to pass through.

19 Claims, 7 Drawing Sheets

(58) Field of Classification Search
USPC .................................................. 285/273, 281
See application file for complete search history.

(56) References Cited

U.S. PATENT DOCUMENTS

| | | | |
|---|---|---|---|
| 5,312,140 A | 5/1994 | Pollack | |
| 2002/0017785 A1* | 2/2002 | Omiya | F16L 27/087 285/121.3 |
| 2002/0043800 A1 | 4/2002 | Montgomery et al. | |

FOREIGN PATENT DOCUMENTS

| | | | | |
|---|---|---|---|---|
| EP | 2360089 A1 * | 8/2011 | ............ | F16L 27/087 |
| EP | 3096060 A1 * | 11/2016 | .............. | F16L 39/04 |
| WO | 90/02289 A1 | 3/1990 | | |
| WO | 98/41792 A2 | 9/1998 | | |
| WO | 2007/048791 A1 | 5/2007 | | |

* cited by examiner

TOROIDAL FLUID SWIVEL FOR HIGH PRESSURE APPLICATIONS

TECHNICAL FIELD

The present invention relates to a toroidal fluid swivel. Also, the invention relates to a method for manufacturing such a toroidal fluid swivel.

PRIOR ART

Toroidal fluid swivels are known in the art for transfer of high-pressure fluids across a rotary interface between an incoming fluid line and an outgoing product piping. Applications for such a swivel include for example offshore oil and gas explorations where high-pressure flows of oil and/or gas are transferred from a (deep-sea) offshore well to a floating vessel. Typically such a floating vessel is equipped with a turret mooring system that can couple a mooring buoy that holds one or more riser lines from the well, to product piping ducts on the vessel. Since the turret mooring system should allow some rotation between the vessel and the buoy, the swivel is likewise adapted to provide rotation between the incoming fluid line and the product piping.

In particular for deep-sea applications there is a need for swivels that can withstand design pressures well over 500 atm for incoming fluid while at the same time, a high flow of the fluid should be transferred.

It is known that to obtain high strength properties for steel workpieces a thickness limitation of steel forgings or castings is present that affects the fabrication of large diameter high-pressure vessels.

The currently known thickness limit for steel workpieces is about 350 mm. The necessary mechanical properties cannot be met when the thickness exceed this critical value. The main reason is the impossibility to achieve adequate heat treatment at the core of the workpiece. Moreover for forgings, strain hardening cannot be properly obtained at the core when the forging is too thick.

However, very high wall thickness is necessary to handle very high pressure and large diameter. The current known limits are approximately a diameter of 2.4 m and a design pressure of 5,000 psi (345 atm) or 2.8 m and a design pressure of 3,500 psi (241 atm). Production of larger high-pressure vessels with higher design pressures by using larger steel workpieces is not well feasible.

In fact, the only known technique, to some extent, is to use very high strength materials (for example exotic steel alloys at relatively high cost) at the expense of limitations in terms of toughness, corrosion resistance, other manufacturing issues and, of course, limited wall thickness. Currently the forging/casting thickness limitation is a showstopper for large diameter vessels and high-pressure applications.

It is an object of the present invention to overcome these disadvantages from the prior art.

SUMMARY OF THE INVENTION

The object is achieved by providing a fluid swivel according to claim 1, for allowing transfer of a fluid across a rotary interface in a swivel rotational central plane between an incoming fluid line and an outgoing product piping; the swivel comprising an inner annular element and an outer annular element, that are located with their adjacent cylindrical surfaces in a close proximity, the inner annular element and the outer annular element defining in the swivel rotational central plane a chamber between the adjacent cylindrical surfaces of the inner and outer annular elements for receiving the fluid, wherein the inner annular element of the swivel is arranged with a connecting conduit to be connected to an end of the incoming fluid line which extends through said element to the chamber for supply of the fluid to the chamber, and wherein the outer annular element of the swivel is arranged to be connected to the outgoing product piping and is provided with a primary duct for transport of the fluid from the chamber to the product piping, wherein the swivel comprises a primary outer reinforcing annular wall arranged adjacent to the outer peripheral wall of the outer annular element, the primary outer reinforcing annular wall being arranged with two peripheral centering surface portions for contacting and/or registering with the outer peripheral wall of the outer annular element, the primary outer reinforcing annular wall further being arranged with at least a first central peripheral opening extending along a portion of the periphery of the outer reinforcing annular wall for allowing the primary duct to pass through there.

Thus, the swivel is designed to maintain the forging thickness/casting well below 350 mm and to use several layers to achieve the required wall thickness. However, mechanical links must be ensured between the outer annular element and the outer reinforcing wall. In fact, the radial expansion of the outer annular element must be partly and mechanically transferred to the outer reinforcing wall and so on, for a pressure vessel under internal pressure. Due to the large radial deflections of such large diameter parts, the mechanical coupling between consecutive layers can be obtained by means of centering surface portions or centering registers such as a centering collar or a centering shoulder, while a positive play is applied. Indeed, standard machining tolerances are good enough to limit the effect of varying centering register plays. In fact, the radial deflection due to external pressure of the annular element would be about a couple of millimeter, whereas the radial play can be easily set within couple of tenths of millimeter—i.e., the centering registers are likely to close quickly thereby mitigating the non-linear effect of an open initial gap.

Alternatively, the radial shrinkage of the outermost layer must be partly and mechanically transferred to the next layer and so on for pressure vessel under external pressure.

In an aspect the invention provides that the peripheral centering surface portions are arranged as a recessed rim with an upper and lower inward edge, arranged to receive the outer peripheral wall of the outer annular element in between the inward edges with an upper edge of the outer peripheral wall fitting the upper inward edge and a lower edge of the outer peripheral wall fitting the lower inward edge. Such a construction provides a stable position of the outer reinforcing annular wall with respect to the outer annular element of the vessel.

In an aspect the invention provides that the primary outer reinforcing annular wall further being arranged with one or more additional central peripheral openings extending along a portion of the periphery of the outer reinforcing annular wall for allowing a secondary duct or a port to pass through.

In an aspect the invention provides that the primary outer reinforcing annular wall comprises an upper outer reinforcing annular wall portion and a lower outer reinforcing annular wall portion wherein the upper and lower portions are coupled to each other by mechanical joints.

By enclosing the outer annular wall between an outer reinforcing annular wall portion and a lower outer reinforcing annular wall portion and joining the two portions mechanically a vessel with large diameter can be constructed in a relatively simple manner. By using an outer reinforcing annular wall portion and a lower outer reinforcing annular wall portion instead of a single outer reinforcing annular wall, the weights to be moved during construction are relatively low.

In an aspect the invention provides that the swivel comprises a primary inner reinforcing annular wall arranged adjacent to the inner peripheral wall of the inner annular element, the primary inner reinforcing annular wall being arranged with two peripheral centering surface portions for contacting and/or registering with the inner peripheral wall of the inner annular element, In an aspect of the invention the primary inner reinforcing annular wall further being arranged with a first central peripheral opening along a portion of the periphery of the inner reinforcing annular wall for allowing the connecting conduit to pass through there.

In a similar manner as for the outer reinforcing annular wall, an inner reinforcing annular wall can be used within the swivel to reinforce the chamber.

In an aspect the invention provides that additionally the swivel comprises an upper inner sealing ring, an upper outer sealing ring, a lower inner sealing ring and a lower outer sealing ring; the upper inner sealing ring being mounted on the inner annular element above the swivel rotational central plane; the upper outer sealing ring being mounted on the outer annular element above the swivel rotational central plane with its inner peripheral surface in close proximity with the outer peripheral surface of the upper inner sealing ring; the lower inner sealing ring being mounted on the inner annular element below the swivel rotational central plane; the lower outer sealing ring being mounted on the outer annular element below the swivel rotational central plane with its inner peripheral surface in close proximity with the outer peripheral surface of the lower inner sealing ring; wherein the swivel comprises a secondary outer upper reinforcing ring, a secondary outer lower reinforcing ring, a secondary inner upper reinforcing ring and a secondary inner lower reinforcing ring, wherein the secondary outer upper reinforcing ring is arranged above the swivel rotational central plane and comprises at an inner peripheral surface a secondary peripheral centering surface portion for contacting and/or registering with the outer peripheral wall of the upper outer sealing ring; the secondary outer lower reinforcing ring is arranged below the swivel rotational central plane and comprises at an inner peripheral surface a secondary peripheral centering surface portion for contacting and/or registering with the outer peripheral wall of the lower outer sealing ring; the secondary inner upper reinforcing ring is arranged above the swivel rotational central plane and comprises at an outer peripheral surface a secondary peripheral centering surface portion for contacting and/or registering with the inner peripheral wall of the inner outer sealing ring, and the secondary inner lower reinforcing ring is arranged below the swivel rotational central plane and comprises at an outer peripheral surface a secondary peripheral centering surface portion for contacting and/or registering with the inner peripheral wall of the lower inner sealing ring.

In case the swivel is equipped with sealing rings around the outer and inner annular walls, the sealing rings can be reinforced in a similar manner as the inner and outer annular wall by means of secondary reinforcing rings both at the exterior and interior parts, and the upper and lower side of the swivel.

In an aspect the invention provides that the swivel comprises an outer upper spacer ring, an outer lower spacer ring, an inner upper spacer ring and an inner lower spacer ring; each spacer ring having an inner centering surface portion at its inner peripheral edge and an outer centering surface portion at its outer peripheral edge; the outer upper spacer ring being intermediate the primary outer reinforcing annular wall and the outer annular element and between the secondary outer upper reinforcing ring and the swivel rotational central plane; the outer lower spacer ring being intermediate the primary outer reinforcing annular wall and the outer annular element and between the secondary outer lower reinforcing ring and the swivel rotational central plane; the inner upper spacer ring being intermediate the primary inner reinforcing annular wall and the inner annular element and between the secondary inner upper reinforcing ring and the swivel rotational central plane; and the inner lower spacer ring being intermediate the primary inner reinforcing annular wall and the inner annular element and between the secondary inner lower reinforcing ring and the swivel rotational central plane.

In this embodiment the spacer rings allow to position the outer reinforcing annular wall and inner reinforcing annular wall at a relatively larger radial distance from the outer annular wall than the sealing rings to allow a relatively simpler method of construction and also to allow a relatively simpler shape of both the sealing rings and the reinforcing annular walls.

Alternatively, the spacer rings can be arranged to locate the sealing rings at a larger radial distance from the outer annular wall than the reinforcing annular walls.

The present invention also relates to a method for manufacturing a toroidal fluid swivel as defined in claim 16.

Advantageous embodiments are further defined by the dependent claims.

BRIEF DESCRIPTION OF DRAWINGS

The invention will be explained in more detail below with reference to drawings in which illustrative embodiments of the invention are shown. It will be appreciated by the person skilled in the art that other alternative and equivalent embodiments of the invention can be conceived and reduced to practice without departing from the true spirit of the invention, the scope of the invention being limited only by the claims.

In the drawings, the same reference numerals refer to similar or identical components in each of the figures.

DETAILED DESCRIPTION OF EMBODIMENTS

Figure 5:
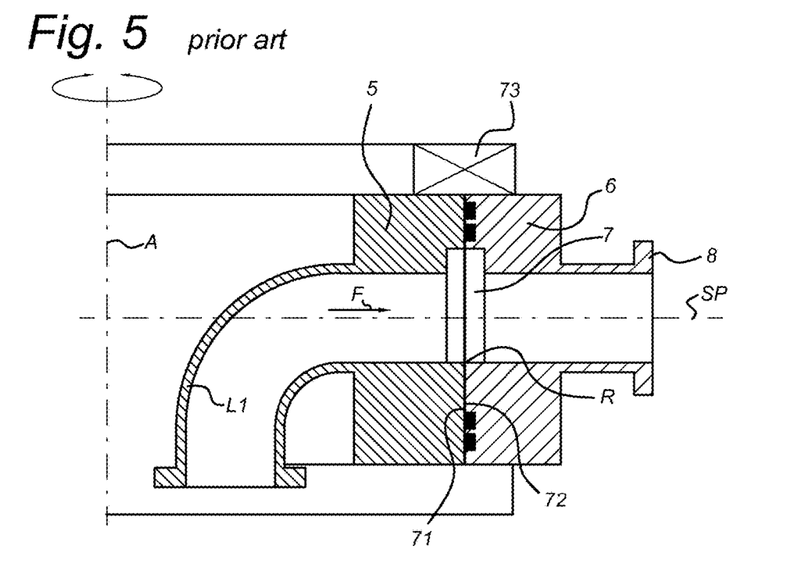
FIG. 5 shows a cross-section of a swivel wall according to the prior art.

FIG. 5 shows a cross-section of a swivel wall of a toroidal fluid swivel according to the prior art.

A toroidal fluid swivel is arranged for transfer of a fluid F across a rotary interface R within a swivel rotational central plane SP between an incoming fluid line and an outgoing product piping. The rotation axis A is perpendicular to the swivel rotational central plane SP. The toroidal fluid swivel comprises an inner annular element 5 and an outer annular element 6, that are located with their adjacent cylindrical surfaces 71, 72 in a close proximity.

In the swivel rotational central plane SP the inner annular element 5 and the outer annular element 6 define a chamber 7 between the adjacent cylindrical surfaces of the inner and outer annular elements 5, 6 for receiving the fluid F.

The inner annular element 5 of the swivel is arranged with a connecting conduit L1 to be connected to an end of the incoming fluid line from for example an offshore well. The connecting conduit L1 extends through the inner annular element 5 into the chamber 7 for supply of the fluid to the chamber.

The outer annular element 6 of the swivel is arranged to be connected to the outgoing product piping and is provided with a primary duct 8 for transport of the fluid from the chamber 7 to the product piping L2 on board of a floating vessel.

The swivel further comprises an arrangement of bearings 73 that guide the inner annular element 5 relative the outer annular element 6. The bearings are schematically depicted by block 73.

Figure 1:
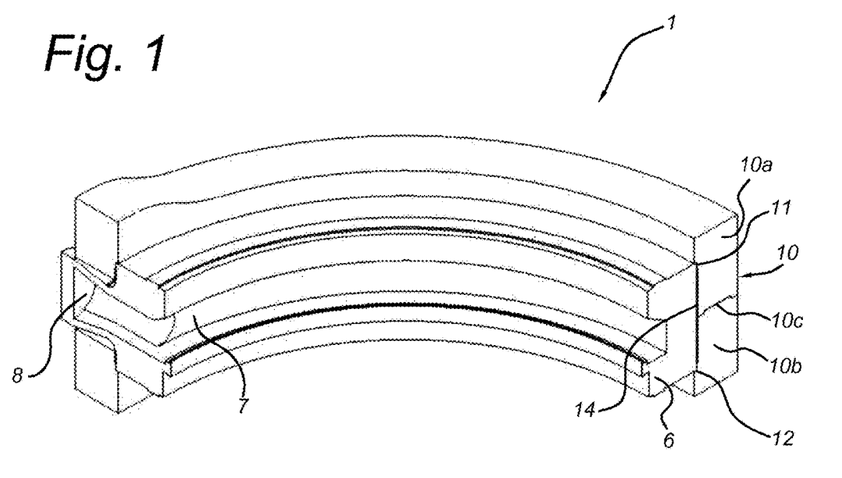
FIG. 1 shows a first perspective view of a sector of a swivel outer part according to an embodiment of the invention.

FIG. 1 shows a first perspective view of a sector of an outer annular element 6 of a swivel according to an embodiment of the invention.

The outer annular element 6 consists of a high strength metal workpiece, preferably made of steel, for example by forging or casting. Around the outer periphery 14 of the outer annular element an outer reinforcing annular wall 10 is positioned. The inner surface of the outer reinforcing annular wall 10 is in close proximity with the outer surface of the outer annular element, and comprises two centering surface portions that extend along the periphery of the inward surface of then reinforcing annular wall 10.

The two centering surface portions 11, 12 are arranged for contacting and/or registering with the outer peripheral wall of the outer annular element with zero or a substantially minimal play. This allows that when the outer annular element due to pressure in the chamber 7 elastically expands, the centering surface portions 11, 12 virtually directly contact the outer surface 14 of the outer annular element 6 and provide a mechanical strengthening of the outer annular element.

Further, the outer reinforcing annular wall has at least a first central peripheral opening 13 extending along a portion of the periphery of the outer reinforcing annular wall for allowing the primary duct 8 to pass trough there.

In an embodiment, the duct is a nozzle or comprises a nozzle shaped portion.

In an embodiment, the outer reinforcing annular wall 10 comprises an upper outer reinforcing annular wall portion 10A and a lower outer reinforcing annular wall portion 10B, that are coupled on a common dividing surface 10C by mechanical joints such as bolts, rods or by welding (not shown in detail). The dividing surface 10C may be a mating surface.

Positioning an upper and lower outer reinforcing annular wall portion 10A, 10B to enclose the outer annular wall 6 between them and joining the two portions mechanically allow a high pressure vessel such as a swivel be constructed with a relatively large diameter without too much effort.

Figure 2:
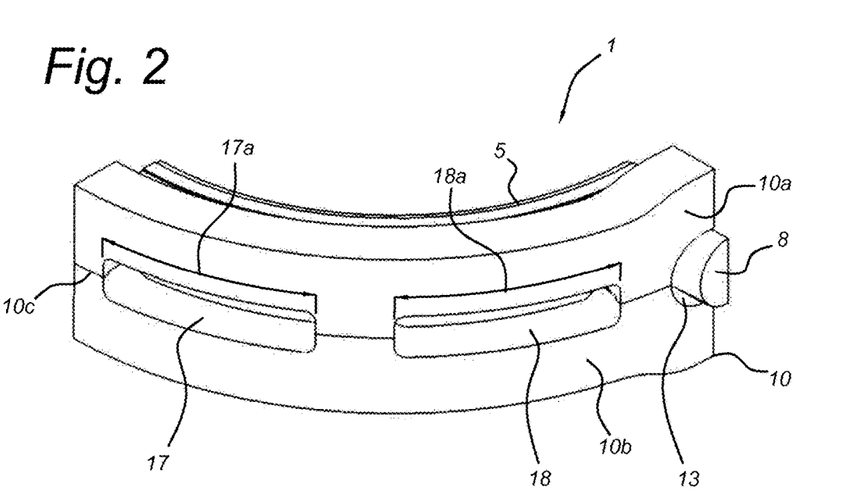
FIG. 2 shows a second perspective view of a sector of a swivel outer part of FIG. 1.

FIG. 2 shows a second perspective view of a sector of the outer annular element 6 of the swivel according to FIG. 1.

In a further embodiment, the outer reinforcing annular wall 10 is arranged with one or more additional central peripheral openings 17; 18 extending along a portion 17a; 18a of the periphery of the outer reinforcing annular wall for allowing a second duct or a port (not shown) to pass through.

Figure 3:
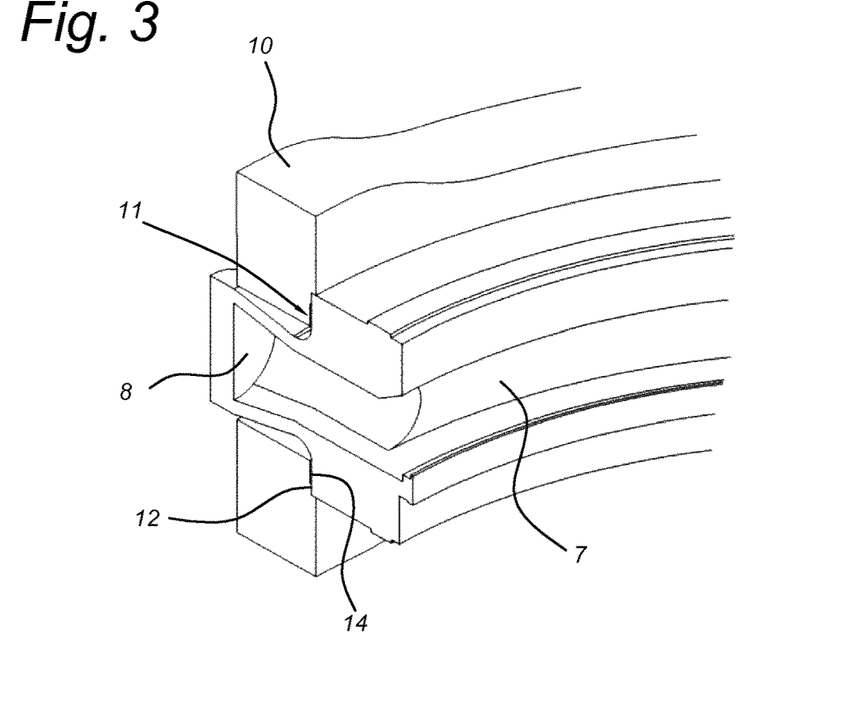
FIGS. 3 and 4 show a detailed view of a sector of a swivel outer part of FIG. 1.
Figure 4:
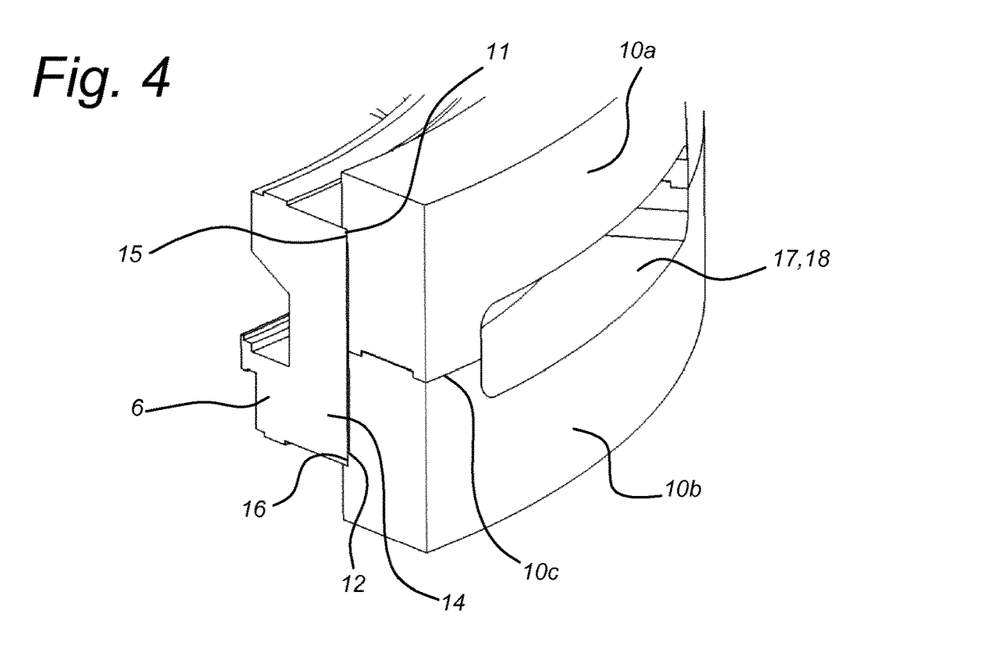

FIG. 3 and FIG. 4 show a detailed view of a sector of the arrangement of the outer annular element and the outer reinforcing wall as shown in FIG. 1.

In an embodiment, the centering surface portions 11, 12 are each arranged as a recessed rim at an upper and lower inward edge, respectively. The recessed rims 11, 12 arranged to receive the outer peripheral wall 14 of the outer annular element 6 in between the inward edges 11, 12.

By designing an appropriate play between the outer reinforcing annular wall and the outer annular element, an upper edge 15 of the outer peripheral wall is arranged to fit the upper inward edge 11 and a lower edge 16 of the outer peripheral wall is arranged to fit the lower inward edge 12.

In this manner the outer annular element is kept in a substantially fixed position within the outer reinforcing annular wall, which improves the stability of the arrangement.

Figure 6:
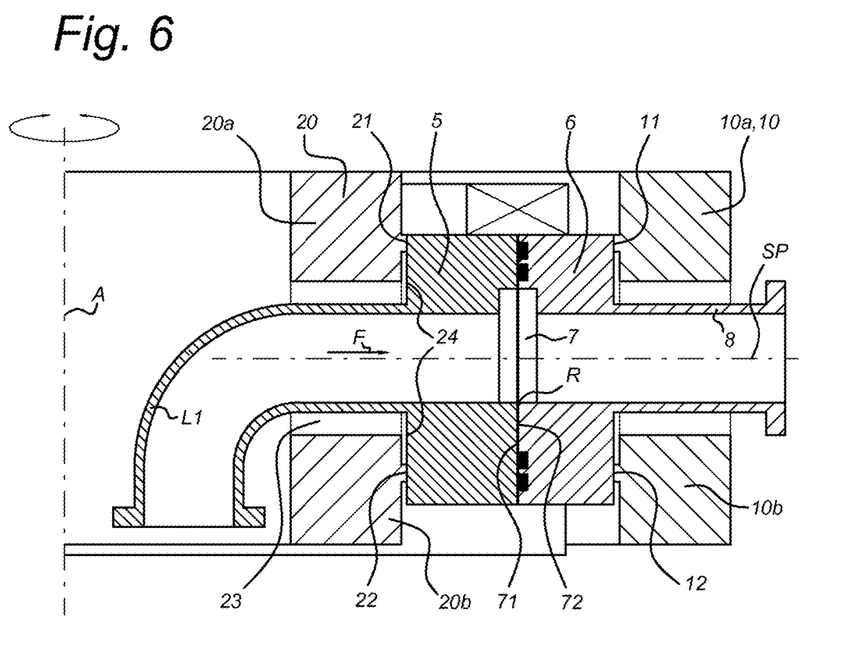
FIG. 6 shows a cross-section of a swivel wall according to an embodiment of the invention.

FIG. 6 shows a cross-section of a swivel wall according to an embodiment of the invention.

In this embodiment, the outer annular element of the swivel is supported by the outer reinforcing annular wall, with centering surface portions that protrude towards the outer peripheral wall or surface 14 of the outer annular element 6.

Additionally, the inner annular element 5 of the toroidal fluid swivel is supported by an inner reinforcing annular wall 20, with inner centering surface portions 21, 22 that protrude outwards to the inner peripheral wall or surface 24 of the inner annular element 5.

This embodiment provides that the inner annular element 5 is supported to prevent its movement away from the outer annular element 6 at the rotary interface R, in case of high pressure from the side of the outer annular element 6.

The inner reinforcing annular wall 20 may comprise an upper and a lower inner reinforcing annular wall portion 20A, 20B that are joint at a dividing peripheral surface (not shown) by mechanical means (bolts or rods) or by welds. In between the upper and lower inner reinforcing annular wall portions 20A, 20B at least one opening 23 will be available for the connecting conduit L1 to pass through.

Figure 7:
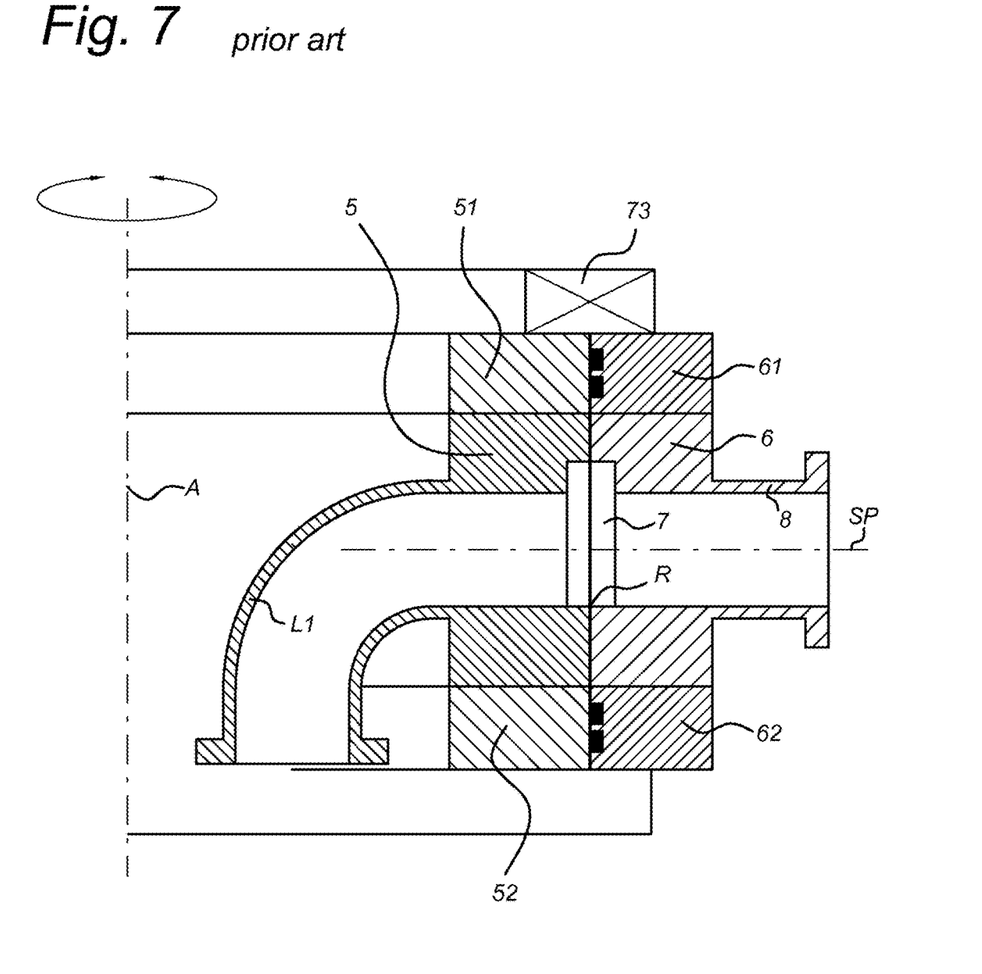
FIG. 7 shows a cross-section of a swivel wall according to the prior art.

FIG. 7 shows a cross-section of a toroidal swivel wall according to the prior art.

The toroidal swivel of FIG. 7 is similar to the swivel shown in FIG. 5. Additionally, the outer and inner annular elements each comprise at their respective upper and lower circular planes parallel to the swivel rotational central plane SP, a sealing ring 51, 61, 52, 62.

The toroidal fluid swivel thus comprises an upper inner sealing ring 51, an upper outer sealing ring 61, a lower inner sealing ring 52 and a lower outer sealing ring 62. The upper inner sealing ring 51 is mounted on the circular surface of the inner annular element 5 above the swivel rotational central plane SP. The upper outer sealing ring 61 is mounted on the circular surface of the outer annular element 6 above the swivel rotational central plane SP. The inner peripheral surface of the upper outer sealing ring 61 is in close proximity with the outer peripheral surface of the upper inner sealing ring 51.

The lower inner sealing ring 52 is mounted on the circular surface of the inner annular element 5 below the swivel rotational central plane SP and the lower outer sealing ring is mounted on the circular surface of the outer annular element 6 below the swivel rotational central plane SP. The inner peripheral surface of the lower outer sealing ring 62 is in close proximity with the outer peripheral surface of the lower inner sealing ring 52.

Figure 8A:
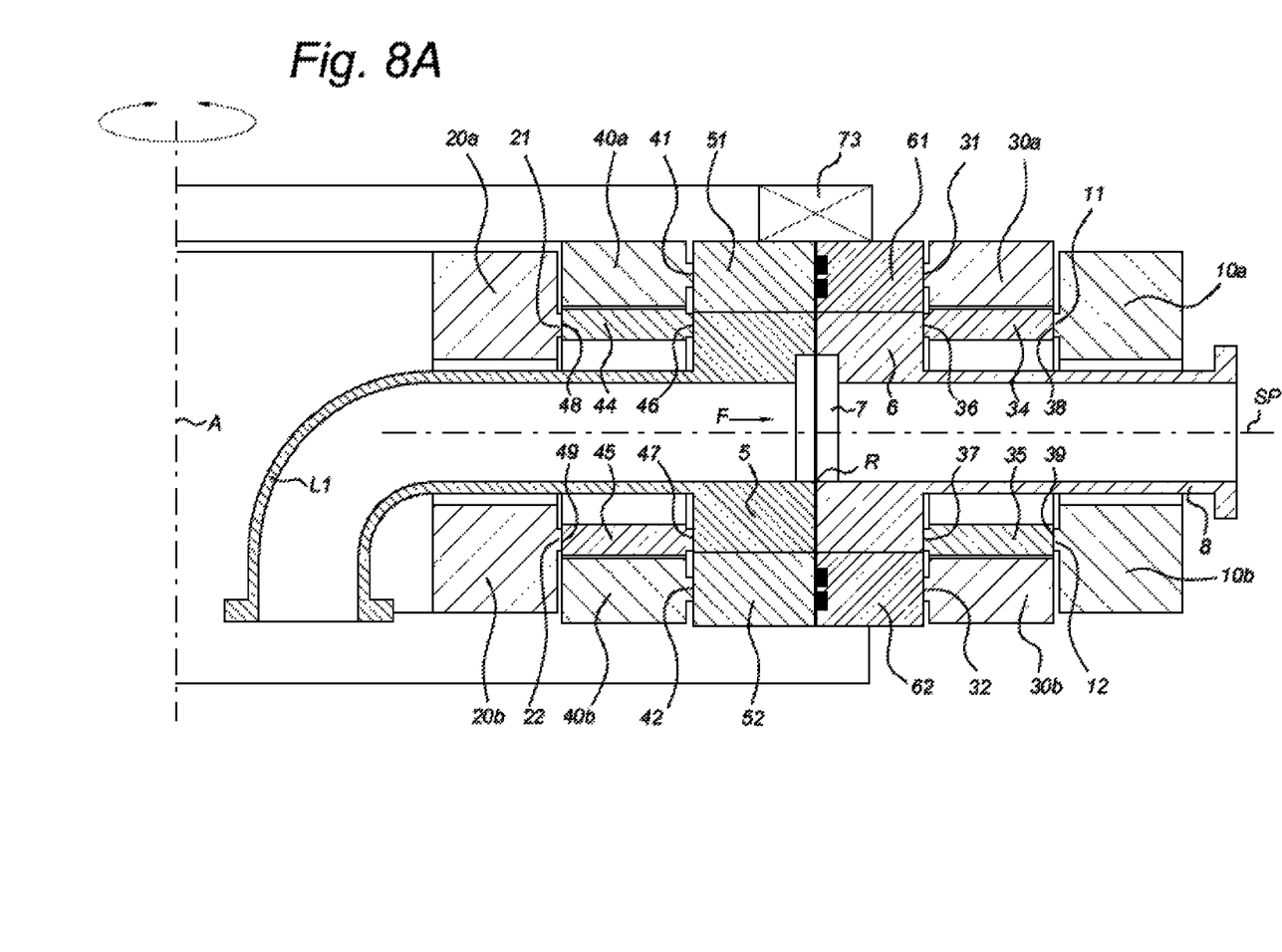
FIG. 8A shows a cross-section of a swivel wall according to an embodiment of the invention and FIG. 8B shows a cross-section of the swivel wall according to an alternative embodiment of the invention.

FIG. 8A shows a cross-section of a toroidal fluid swivel wall according to an embodiment of the invention. In this embodiment, the prior art toroidal fluid swivel as shown in FIG. 7 is reinforced on both the outer and inner periphery.

In addition to the outer reinforcing annular wall 10;10A, 10B and inner reinforcing annular wall 20; 20A, 20B that are arranged with respective centering surface portions 11, 12; 21, 22 to contact or register with the outer peripheral wall 14 of the outer annular element and the inner peripheral wall 24 of the inner annular element respectively, the swivel comprises a secondary outer upper reinforcing ring 30A, a secondary outer lower reinforcing ring 30B, a secondary inner upper reinforcing ring 40A and a secondary inner lower reinforcing ring 40B. Each of the rings 30A, 30B, 40A, 40B has a centre that coincides with the rotation axis A of the swivel.

The secondary outer upper reinforcing ring 30A is arranged above the swivel rotational central plane SP and comprises at an inner peripheral surface a secondary peripheral centering surface portion 31 for contacting and/or registering with the outer peripheral wall of the upper outer sealing ring 61.

The secondary outer lower reinforcing ring 30B is arranged below the swivel rotational central plane SP and comprises at an inner peripheral surface a secondary peripheral centering surface portion 32 for contacting and/or registering with the outer peripheral wall of the lower outer sealing ring 62.

The secondary inner upper reinforcing ring 40A is arranged above the swivel rotational central plane SP and comprises at an outer peripheral surface a secondary peripheral centering surface portion 41 for contacting and/or registering with the inner peripheral wall of the inner outer sealing ring 51.

The secondary inner lower reinforcing ring 40B is arranged below the swivel rotational central plane SP and comprises at an outer peripheral surface a secondary peripheral centering surface portion 42 for contacting and/or registering with the inner peripheral wall of the lower inner sealing ring 52.

In an embodiment, each outer upper and lower reinforcing ring 10A, 10B could be stacked with its associated secondary outer upper and lower reinforcing ring 30A, 30B, depending the rings can be constructed appropriately in terms of dimensions and strength. Likewise, each inner upper and lower reinforcing rings 20A, 20B could be stacked with the associated secondary inner upper and lower reinforcing ring 40A, 40B.

However, stacking may be prohibited due to the size (height) of the reinforcing rings.

In an embodiment, the secondary reinforcing rings 30A, 30B, 40A, 40B are spaced apart from the reinforcing rings 10A, 10B, 20A, 20B in a direction parallel to the swivel rotational central lane SP. The toroidal fluid swivel comprises an outer upper spacer ring 34, an outer lower spacer ring 35, an inner upper spacer ring 44 and an inner lower spacer ring 45. Each spacer ring has a center that coincides with the rotational axis A of the swivel.

Further each spacer ring 34, 35, 44, 45 has an inner centering surface portion 36, 37, 46, 47 at its inner peripheral edge and an outer centering surface portion 38, 39, 48, 49 at its outer peripheral edge.

In the embodiment shown in FIG. 8A, the reinforcing rings 10A, 10B, 20A, 20B are positioned at a relatively larger distance from the outer and inner annular walls than the secondary reinforcing rings 30A, 30B, 40A, 40B. The outer upper spacer ring 34 is arranged horizontally intermediate the upper outer reinforcing annular wall 10A and the outer annular element 6 and vertically between the secondary outer upper reinforcing ring 30A and the swivel rotational central plane SP. The outer lower spacer ring 35 is positioned horizontally intermediate the lower outer reinforcing annular wall 10B and the outer annular element 6 and vertically between the secondary outer lower reinforcing ring 30B and the swivel rotational central plane SP. The inner upper spacer ring 44 is horizontally intermediate the upper inner reinforcing annular wall 20A and the inner annular element 5 and vertically between the secondary inner upper reinforcing ring 40A and the swivel rotational central plane SP. The inner lower spacer ring 45 is positioned horizontally intermediate the lower inner reinforcing annular wall 20B and the inner annular element 5 and vertically between the secondary inner lower reinforcing ring 40B and the swivel rotational central plane SP.

Figure 8B:
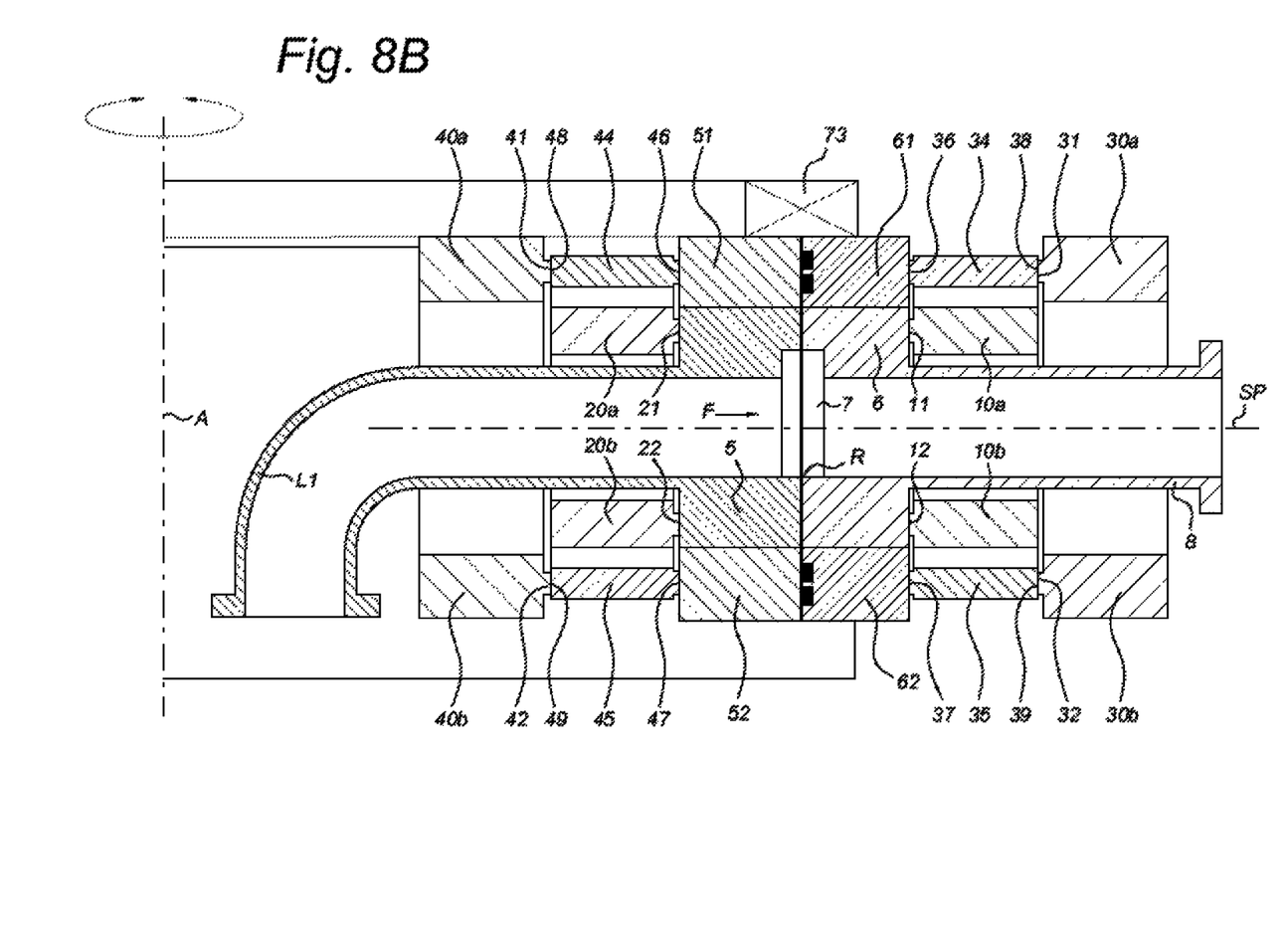

Alternatively, as shown in FIG. 8B, the arrangement may be reversed: the reinforcing rings 10A, 10B, 20A, 20B are positioned at a relatively shorter distance from the outer and inner annular walls than the secondary reinforcing rings 30A, 30B, 40A, 40B, by inserting the spacer rings between the each secondary reinforcing ring 30A; 30B; 40A; 40B and the respective sealing ring 61; 62; 51; 52.

As shown above with reference to FIGS. 1-8B, obtaining a mechanical coupling between consecutive rings (annular elements) is necessary since the purpose is to transfer part of the radial deflection of the loaded ring to the reinforcing ring. The approach as described above is the application of centering surface portions or centering registers. To this end the radial play between consecutive rings (e.g. between the outer annular wall and the outer reinforcing ring) must be relatively small enough compared to the expected radial deflection of the loaded ring (in this example the outer annular wall).

Figure 9:
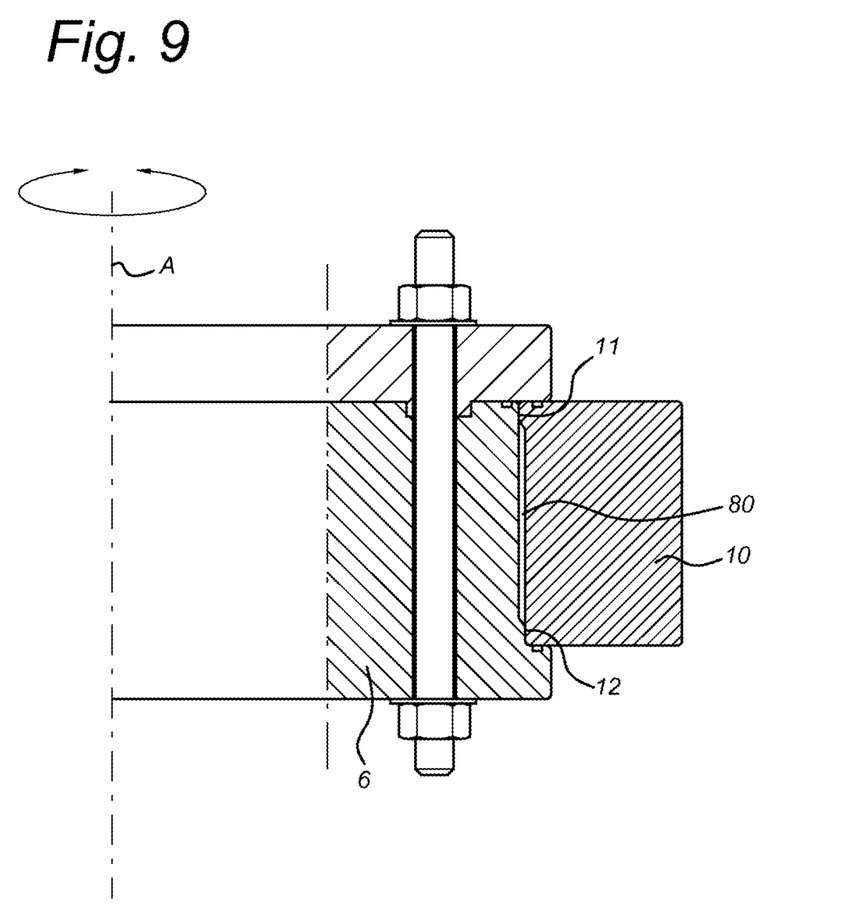
FIG. 9 shows a cross-section of a swivel wall according to an embodiment of the invention.

FIG. 9 shows a cross-section of a detail of a swivel wall according to an embodiment of the invention.

In this alternative embodiment, mechanical coupling is obtained by hydraulic means. Between an outer and inner annular element 6; 5 of the swivel and the associated outer or inner reinforcing ring 10; 10A, 10B; 20; 20A, 20B a secondary annular chamber 80 is created between the centering surface positions 11, 12; 21, 22. The secondary chamber is coupled to a hydraulic system (not shown) that is arranged to inject fluid into the secondary chamber. Varying the pressure level of the injected fluid permits to adjust the load sharing between two consecutive rings (e.g. the outer annular element and the outer reinforcing ring). It is noted that the centering surface portions can be arranged as a mechanical back-up.

In an embodiment, the material of the outer reinforcing annular wall and/or the inner reinforcing annular wall selected from a material group comprising steel alloys and composites.

Similarly, the spacer rings can be manufactured from a same material such a steel alloy or a composite.

In case a steel alloy is selected, the steel may be a forged steel, a rolled steel plate material or a cast steel.

The invention has been described with reference to the above embodiments. Obvious modifications and alterations will occur to others upon reading and understanding the preceding detailed description. It is intended that the invention be construed as including all such modifications and alterations insofar as they come within the scope of the appended claims.

The invention claimed is:

1. A fluid swivel for allowing transfer of a fluid across a rotary interface in a swivel rotational central plane between an incoming fluid line and an outgoing product piping, the swivel comprising:
   an inner annular element and an outer annular element, that are located with their adjacent cylindrical surfaces in a close proximity, the inner annular element and the outer annular element defining in the swivel rotational central plane a chamber between the adjacent cylindrical surfaces of the inner and outer annular elements for receiving the fluid, wherein the inner annular element of the swivel is arranged with a connecting conduit to be connected to an end of the incoming fluid line which extends through said element to the chamber for supply of the fluid to the chamber, and wherein the outer annular element of the swivel is arranged to be connected to the outgoing product piping and is provided with a primary duct for transport of the fluid from the chamber to the product piping; and
   a primary outer reinforcing annular wall arranged adjacent to and around the outer peripheral wall of the outer annular element, the primary outer reinforcing annular wall being arranged with two peripheral centering surface portions for contacting and/or registering with the outer peripheral wall of the outer annular element, the primary outer reinforcing annular wall further being arranged with at least a first central peripheral opening extending along a portion of the periphery of the outer reinforcing annular wall for allowing the primary duct to pass through there.

2. The swivel according to claim 1, wherein the peripheral centering surface portions are arranged as a recessed rim with an upper and lower inward edge, arranged to receive the outer peripheral wall of the outer annular element in between the inward edges with an upper edge of the outer peripheral wall fitting the upper inward edge and a lower edge of the outer peripheral wall fitting the lower inward edge.

3. The swivel according to claim 2, wherein the primary outer reinforcing annular wall is further arranged with one or more additional central peripheral openings extending along a portion of the periphery of the outer reinforcing annular wall for allowing either a second duct or a port to pass through.

4. The swivel according to claim 1, wherein the primary outer reinforcing annular wall further being arranged with one or more additional central peripheral openings extending along a portion of the periphery of the outer reinforcing annular wall for allowing either a second duct or a port to pass through.

5. The swivel according to claim 1, wherein the primary outer reinforcing annular wall comprises an upper outer reinforcing annular wall portion and a lower outer reinforcing annular wall portion, and wherein the upper and lower portions are coupled to each other by mechanical joints.

6. The swivel according to claim 1, further comprising a primary inner reinforcing annular wall arranged adjacent to the inner peripheral wall of the inner annular element, the primary inner reinforcing annular wall being arranged with two peripheral centering surface portions for contacting and/or registering with the inner peripheral wall of the inner annular element, the primary inner reinforcing annular wall further being arranged with a first central peripheral opening along a portion of the periphery of the inner reinforcing annular wall for allowing the connecting conduit to pass through there.

7. The swivel according to claim 6, wherein the primary inner reinforcing annular wall comprises an upper inner reinforcing annular wall portion and a lower inner reinforcing annular wall portion wherein the upper and lower portions are coupled to each other by mechanical joints.

8. The swivel according to claim 7, wherein additionally the swivel comprises an upper inner sealing ring, an upper outer sealing ring, a lower inner sealing ring and a lower outer sealing ring,
   the upper inner sealing ring being mounted on the inner annular element above the swivel rotational central plane; the upper outer sealing ring being mounted on the outer annular element above the swivel rotational central plane with its inner peripheral surface in close proximity with the outer peripheral surface of the upper inner sealing ring,
   the lower inner sealing ring being mounted on the inner annular element below the swivel rotational central plane; the lower outer sealing ring being mounted on the outer annular element below the swivel rotational central plane with its inner peripheral surface in close proximity with the outer peripheral surface of the lower inner sealing ring,
   wherein the swivel comprises a secondary outer upper reinforcing ring, a secondary outer lower reinforcing ring, a secondary inner upper reinforcing ring and a secondary inner lower reinforcing ring,
   wherein the secondary outer upper reinforcing ring is arranged above the swivel rotational central plane and comprises at an inner peripheral surface a secondary peripheral centering surface portion for contacting and/or registering with the outer peripheral wall of the upper outer sealing ring,
   the secondary outer lower reinforcing ring is arranged below the swivel rotational central plane and comprises at an inner peripheral surface a secondary peripheral centering surface portion for contacting and/or registering with the outer peripheral wall of the lower outer sealing ring,
   the secondary inner upper reinforcing ring is arranged above the swivel rotational central plane and comprises at an outer peripheral surface a secondary peripheral centering surface portion for contacting and/or registering with the inner peripheral wall of the inner outer sealing ring, and
   the secondary inner lower reinforcing ring is arranged below the swivel rotational central plane and comprises at an outer peripheral surface a secondary peripheral centering surface portion for contacting and/or registering with the inner peripheral wall of the lower inner sealing ring.

9. The swivel according to claim 6, further comprising:
   an upper inner sealing ring;
   an upper outer sealing ring;
   a lower inner sealing ring;
   a lower outer sealing ring;
      the upper inner sealing ring being mounted on the inner annular element above the swivel rotational central plane,
      the upper outer sealing ring being mounted on the outer annular element above the swivel rotational central plane with its inner peripheral surface in close proximity with the outer peripheral surface of the upper inner sealing ring, the lower inner sealing ring being mounted on the inner annular element below the swivel rotational central plane, the lower outer sealing ring being mounted on the outer annular element below the swivel rotational central plane with its inner peripheral surface in close proximity with the outer peripheral surface of the lower inner sealing ring;

a secondary outer upper reinforcing ring;
a secondary outer lower reinforcing ring;
a secondary inner upper reinforcing ring; and
a secondary inner lower reinforcing ring, wherein the secondary outer upper reinforcing ring is arranged above the swivel rotational central plane and comprises at an inner peripheral surface a secondary peripheral centering surface portion for contacting and/or registering with the outer peripheral wall of the upper outer sealing ring, the secondary outer lower reinforcing ring is arranged below the swivel rotational central plane and comprises at an inner peripheral surface a secondary peripheral centering surface portion for contacting and/or registering with the outer peripheral wall of the lower outer sealing ring, the secondary inner upper reinforcing ring is arranged above the swivel rotational central plane and comprises at an outer peripheral surface a secondary peripheral centering surface portion for contacting and/or registering with the inner peripheral wall of the inner outer sealing ring, and the secondary inner lower reinforcing ring is arranged below the swivel rotational central plane and comprises at an outer peripheral surface a secondary peripheral centering surface portion for contacting and/or registering with the inner peripheral wall of the lower inner sealing ring.

10. The swivel according to claim 9, further comprising:
an outer upper spacer ring;
an outer lower spacer ring;
an inner upper spacer ring; and
an inner lower spacer ring,
each spacer ring having an inner centering surface portion at its inner peripheral edge and an outer centering surface portion at its outer peripheral edge,
the outer upper spacer ring being intermediate the primary outer reinforcing annular wall and the outer annular element and between the secondary outer upper reinforcing ring and the swivel rotational central plane,
the outer lower spacer ring being intermediate the primary outer reinforcing annular wall and the outer annular element and between the secondary outer lower reinforcing ring and the swivel rotational central plane,
the inner upper spacer ring being intermediate the primary inner reinforcing annular wall and the inner annular element and between the secondary inner upper reinforcing ring and the swivel rotational central plane, and
the inner lower spacer ring being intermediate the primary inner reinforcing annular wall and the inner annular element and between the secondary inner lower reinforcing ring and the swivel rotational central plane.

11. The swivel according to claim 10, wherein the spacer rings are manufactured from a material selected from the group comprising steel, steel alloys and composites.

12. The swivel according to claim 11, wherein the steel comprises forged steel, rolled steel plate and cast steel.

13. The swivel according to claim 9, further comprising:
an outer upper spacer ring;
an outer lower spacer ring;
an inner upper spacer ring; and
an inner lower spacer ring,
each spacer ring having an inner centering surface portion at its inner peripheral edge and an outer centering surface portion at its outer peripheral edge,
the outer upper spacer ring being intermediate the secondary outer upper reinforcing ring and the upper outer sealing ring, and above the primary outer reinforcing annular wall and the swivel rotational central plane,
the outer lower spacer ring being intermediate the secondary outer upper reinforcing ring and the lower outer sealing ring, and below the primary outer reinforcing annular wall and the swivel rotational central plane,
the inner upper spacer ring being intermediate the secondary outer upper reinforcing ring and the inner upper sealing ring, and above the primary inner upper reinforcing annular wall and the swivel rotational central plane, and
the inner lower spacer ring being intermediate secondary inner lower reinforcing ring and the inner lower sealing ring, and below the primary inner lower reinforcing annular wall and the swivel rotational central plane.

14. The swivel according to claim 6, wherein the outer reinforcing annular wall and/or the inner reinforcing annular wall is manufactured from a material selected from a group comprising steel, steel alloys and composites.

15. The swivel according to claim 14, wherein the steel comprises forged steel, rolled steel plate and cast steel.

16. The swivel according to claim 1, wherein the primary duct either is a nozzle or comprises a nozzle shaped portion.

17. The swivel according to according to claim 1, wherein additionally between the outer annular element of the swivel and the associated outer reinforcing ring a secondary annular chamber is created in between the centering surface positions, the secondary annular chamber being arranged for coupling to a hydraulic system arranged for injecting hydraulic fluid into said secondary annular chamber.

18. The swivel according to according to claim 1, wherein additionally between the inner annular element of the swivel and the associated inner reinforcing ring a further annular chamber is created in between the centering surface positions, the further annular chamber being arranged for coupling to a hydraulic system arranged for injecting hydraulic fluid into said further annular chamber.

19. A method for manufacturing a toroidal fluid swivel for transfer of a fluid across a rotary interface in a swivel rotational central plane between an incoming fluid line and an outgoing product piping, the swivel comprising an inner annular element and an outer annular element, that are located with their adjacent cylindrical surfaces in a close proximity, the inner annular element and the outer annular element defining in the swivel rotational central plane a chamber between the adjacent cylindrical surfaces of the inner and outer annular elements for receiving the fluid, wherein the inner annular element of the swivel is arranged with a connecting conduit to be connected to an end of the incoming fluid line which extends through said element to the chamber for supply of the fluid to the chamber, and wherein the outer annular element of the swivel is arranged to be connected to the outgoing product piping and is provided with a primary duct for transport of the fluid from the chamber to the product piping, the method comprising:

arranging a primary outer reinforcing annular wall adjacent to and around the outer peripheral wall of the outer annular element;

arranging the primary outer reinforcing annular wall with two peripheral centering surface portions for contacting and/or registering with the outer peripheral wall of the outer annular element; and arranging the primary outer reinforcing annular wall further with at least a first central peripheral opening extending along a portion of the periphery of the outer reinforcing annular wall for allowing the primary duct to pass there through.

\* \* \* \* \*